United States Patent
Sato (10) Patent No.: US 7,830,169 B2
(45) Date of Patent: Nov. 9, 2010

(54) SEMICONDUCTOR DEVICE

(75) Inventor: Tomio Sato, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/567,455

(22) Filed: Sep. 25, 2009

(65) Prior Publication Data

US 2010/0013538 A1 Jan. 21, 2010

Related U.S. Application Data

(63) Continuation of application No. PCT/JP2007/057213, filed on Mar. 30, 2007.

(51) Int. Cl.
*H03K 17/16* (2006.01)
*H03K 19/003* (2006.01)

(52) U.S. Cl. ............... 326/33; 326/34; 326/93

(58) Field of Classification Search ........ None
See application file for complete search history.

(56) References Cited

U.S. PATENT DOCUMENTS 6,054,751 A 4/2000 Ichikawa et al.

| | | | |
|---|---|---|---|
| 2003/0098742 A1 * | 5/2003 | Nakagawa et al. | 327/551 |
| 2004/0041547 A1 | 3/2004 | Asano | |
| 2005/0062523 A1 * | 3/2005 | Wang et al. | 327/554 |
| 2008/0055018 A1 * | 3/2008 | Umamichi et al. | 333/181 |

FOREIGN PATENT DOCUMENTS

| JP | 08102525 A | 4/1996 |
|---|---|---|
| JP | 10150148 A | 6/1998 |
| JP | 11120214 A | 4/1999 |
| JP | 2004088638 A | 3/2004 |

* cited by examiner

*Primary Examiner*—Anh Q Tran
(74) *Attorney, Agent, or Firm*—Arent Fox LLP (57) ABSTRACT

There is provided a current amount adjusting section adjusting a current amount flowing through a power supply line supplying power to an internal circuit which includes a circuit operating based on a clock signal and a ratio of consumed charge amounts by the current flowing at a rising edge of the clock signal and by the current flowing at a falling edge of the clock signal so that noise generated in the power supply line may be restrained.

17 Claims, 7 Drawing Sheets

SEMICONDUCTOR DEVICE

CROSS-REFERENCE TO RELATED APPLICATIONS

This is a continuation of International Application No. PCT/JP2007/057213, filed on Mar. 30, 2007, the entire contents of which are hereby incorporated by reference.

FIELD

The present application relates to a semiconductor device, and technology to reduce noise generated in a semiconductor device.

BACKGROUND

Figure 8:
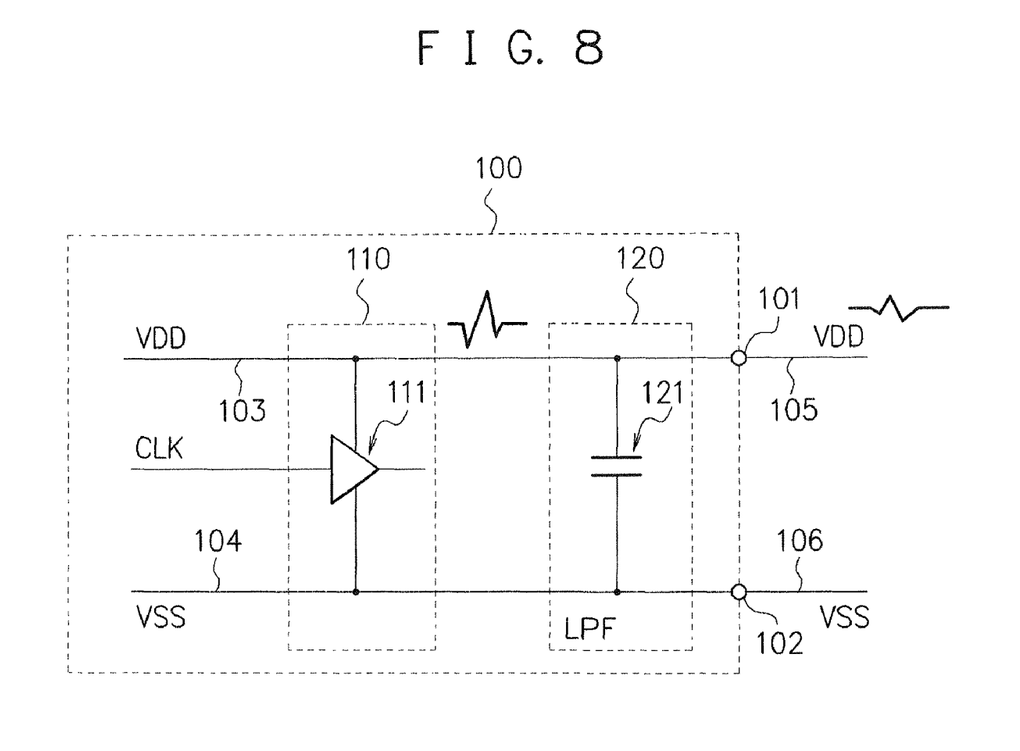
FIG. 8 is a diagram depicting noise reduction technology in a conventional semiconductor device.

FIG. 8 depicts noise reduction technology in a conventional semiconductor device (for example, see Patent Document 1). An internal circuit 110 in a semiconductor device 100 is an internal circuit which includes a circuit operating in synchronization with a clock signal, and is schematically depicted in FIG. 8 by a buffer 111 to which a clock signal CLK is inputted. The internal circuit 110 is supplied with a power supply potential VDD by a VDD power supply line 103 and supplied with a reference potential VSS by a VSS power supply line 104.

When an output of the internal circuit 110 is switched, high-frequency noise due to switching is generated in the power supply lines 103, 104 to which the internal circuit 110 is coupled. The generated noise is propagated through the power supply lines 103, 104 and is propagated to power supply lines 105, 106 of the outside via terminals 101, 102.

Conventionally, a low-pass filter (LPF) 120 is provided in a path through which generated noise is propagated, to restrain the noise from being propagated outside. The LPF 120 is constituted, as depicted in an example of FIG. 8, with a capacitance 121 coupled between the VDD power supply line 103 and the VSS power supply line 104 in the semiconductor device 100, for example.

Further, in order to carry out a noise suppression effectively, there is suggested a simulation method in which noise generated from an integrated circuit may be evaluated in a stage of a circuit design or a layout design of the integrated circuit (for example, see Patent Document 2).

Patent Document 1: Japanese Laid-open Patent Publication No. 08-102525

Patent Document 2: Japanese Laid-open Patent Publication No. 11-120214

SUMMARY

A semiconductor device according to the present embodiment includes: an internal circuit including a circuit operating based on a clock signal; a power supply line supplying power to the internal circuit; and a current amount adjusting section adjusting a current amount flowing through the power supply line in synchronization with the clock signal, wherein the current amount adjusting section adjusts the current amount flowing at a rising edge of the clock signal and the current amount flowing at a falling edge of the clock signal.

The object and advantages of the embodiment will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Hereinafter, an embodiment will be described with reference to the drawings.

Figure 1:
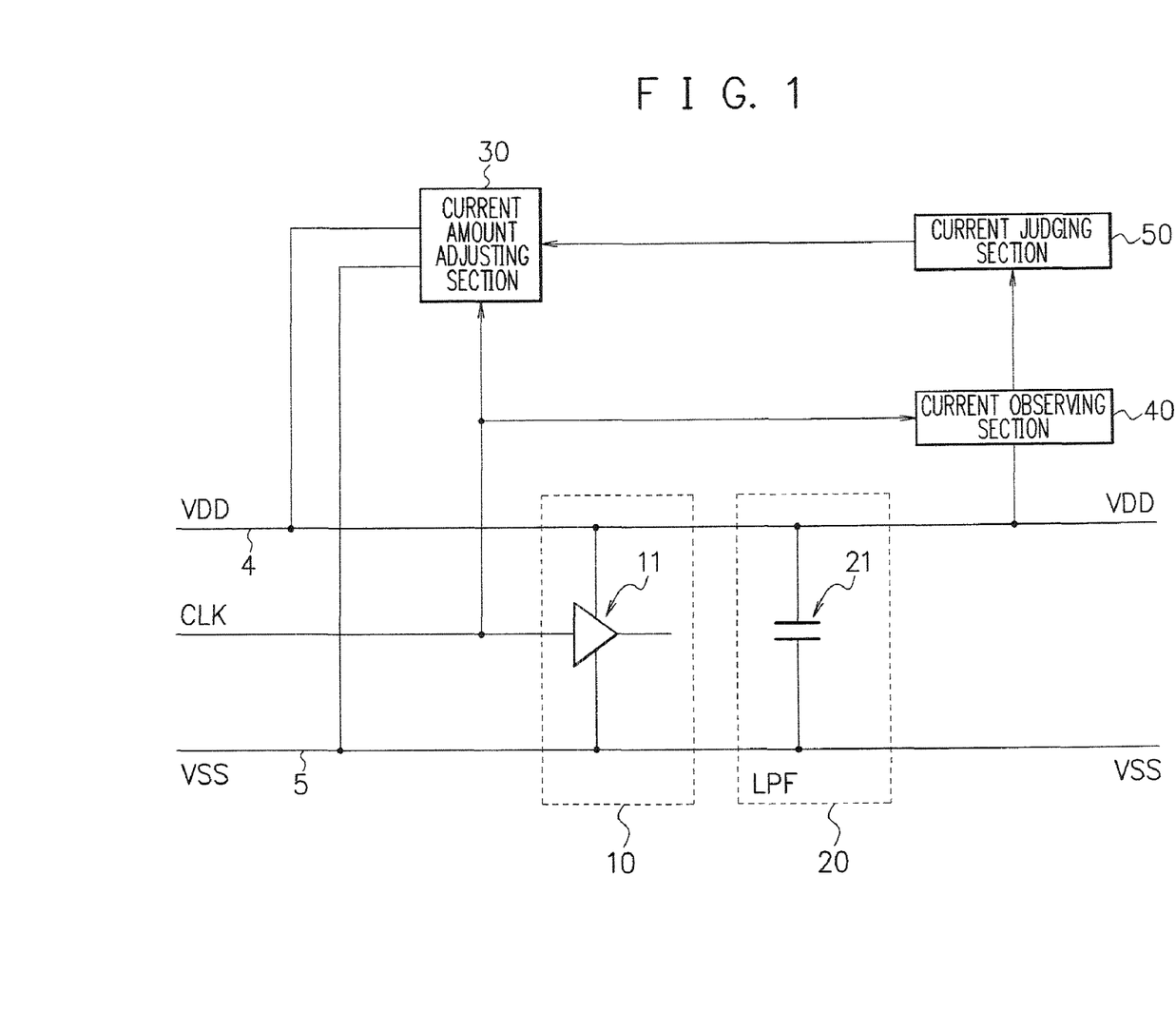
FIG. 1 is a diagram depicting a constitution example of a semiconductor device according to an embodiment.

FIG. 1 is a diagram depicting a constitution example of a semiconductor device according to an embodiment.

In FIG. 1, an internal circuit 10 is an internal circuit which includes a circuit operating in synchronization with a clock signal and is schematically depicted by a buffer 11 to which a fundamental operation clock signal (hereinafter, simply referred to as "clock signal") CLK of the semiconductor device is inputted. To the internal circuit 10 are coupled a VDD power supply line 4 to supply a power supply potential VDD and a VSS power supply line 5 to supply a reference potential VSS.

A low-pass filter (LPF) 20 is a circuit to restrain noise propagated through the power supply lines 4, 5. The LPF 20 is constituted with, for example, a capacitance 21 coupled between the VDD power supply line 4 and the VSS power supply line 5. It is noted that the present embodiment is not limited to presence/absence of the LPF 20 nor its constitution.

A control signal from a current judging section 50 and the clock signal CLK is inputted to a current amount adjusting section 30. The current amount adjusting section 30 adjusts current amounts flowing through the VDD power supply line 4 and the VSS power supply line 5 inside the semiconductor device. More specifically, the current amount adjusting section 30 individually adjusts current amounts flowing through the VDD power supply line 4 and the VSS power supply line 5 at a rise of a clock signal (hereinafter, referred to as current amounts flowing at a rise of a clock signal) and current amounts flowing through the VDD power supply line 4 and the VSS power supply line 5 at a fall of the clock signal (hereinafter, referred to as current amounts flowing at a fall of a clock signal), in correspondence with the control signal from the current judging section 50 in synchronization with the clock signal CLK.

A current observing section 40 observes the current amounts flowing through the power supply lines 4, 5.

The current judging section 50 judges whether or not the current amounts flowing through the power supply lines 4, 5 are proper, based on an observation result of the current amounts by the current observing section 40. The current judging section 50 compare-judges whether or not a relation between the current amount flowing at the rise of the clock signal and the current amount flowing at the fall of the clock signal is proper, and outputs a control signal in correspondence with a result of the judgment to the current amount adjusting section 30.

Figure 2:
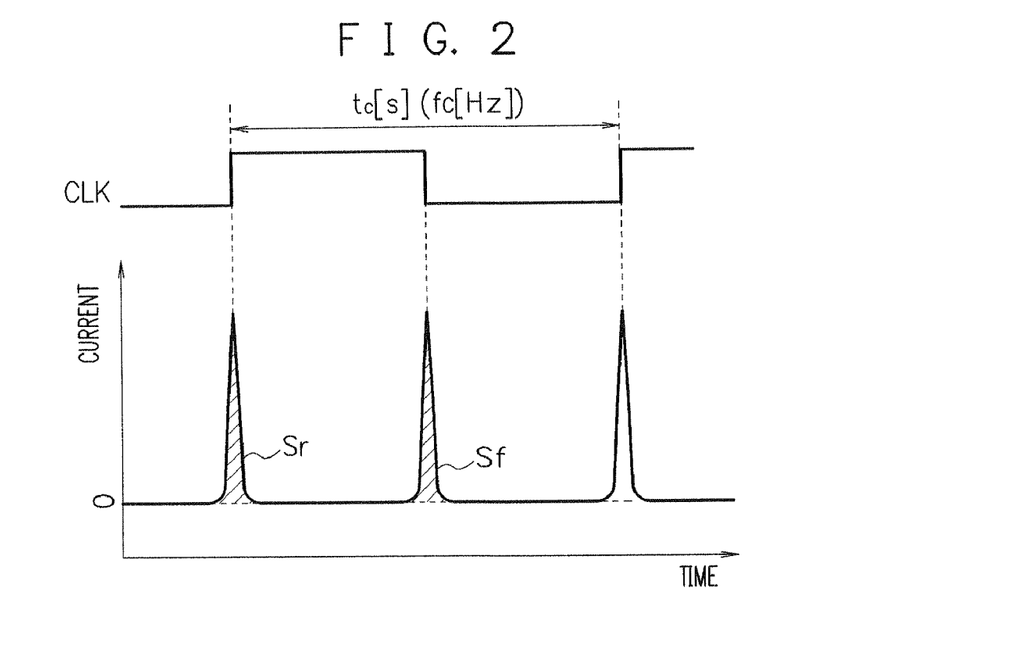
FIG. 2 is a graph depicting a relation between a current amount flowing through a power supply line of a semiconductor device and a clock signal.

Here, in the internal circuit 10 inside the semiconductor device, pulsed currents flow in synchronization with a rising edge and a falling edge of the clock signal CLK as depicted in an example of FIG. 2. A characteristic of noise and a noise amount are determined by a current waveform of the above.

FIG. 2 is a graph depicting a relation between the current amounts flowing through the power supply lines 4, 5 of the semiconductor device and the clock signal CLK. As depicted in FIG. 2, the clock signal CLK has a cycle tc[s] (a frequency fc[Hz]), and a current waveform area at a rise of the clock signal CLK is designated as Sr while a current waveform area at a fall of the clock signal CLK is designated as Sf. The current waveform areas Sr, Sf are each equivalent to a charge amount consumed by the internal circuit 10 or the like at the edge of the clock signal CLK.

Figure 3:
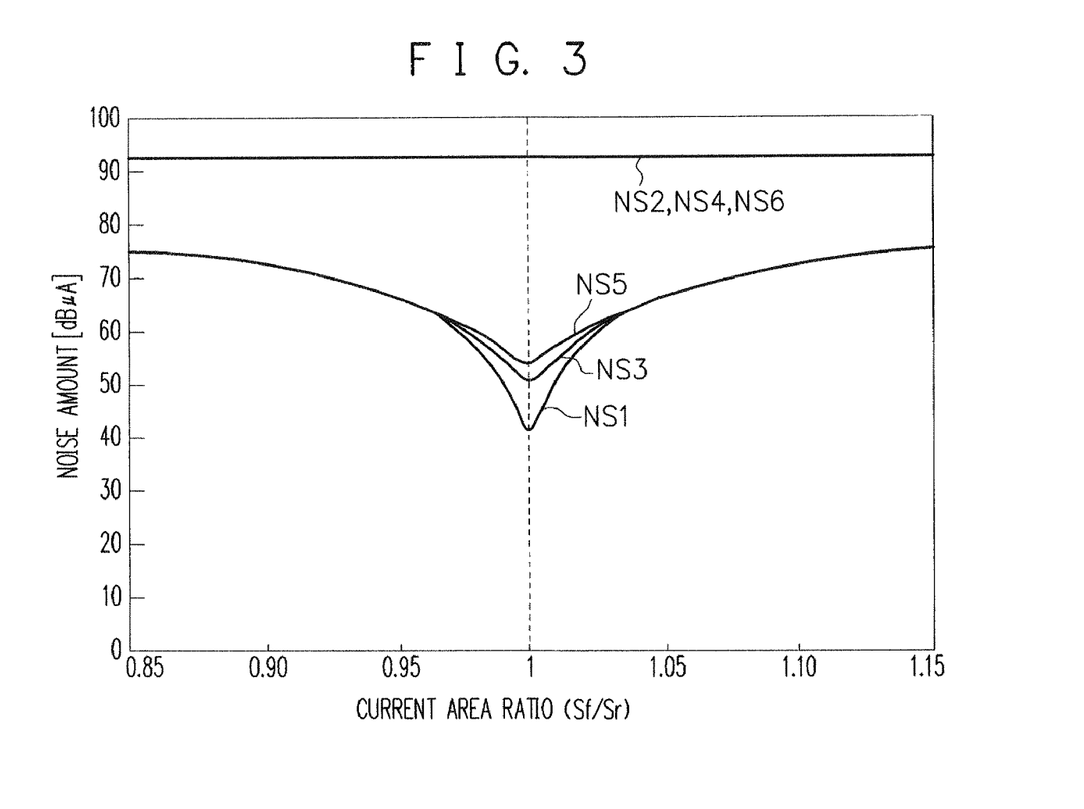
FIG. 3 is a graph depicting a relation between a harmonic noise amount and a current waveform area ratio.

FIG. 3 depicts noise amounts generated when the current waveform areas Sr, Sf are changed. In FIG. 3, a vertical axis indicates a noise amount [dBμA], while a horizontal axis indicates a current waveform area ratio (Sf/Sr) when the current waveform area Sf is changed with the current waveform area Sr being constant.

A line NSi ("i" is a subscript, and i=1, 2, 3, 4, 5, 6) depicted in FIG. 3 may be obtained as a result that current waveforms of the currents flowing through the power supply lines 4, 5 of the semiconductor device as depicted in FIG. 2 are Fourier-analyzed and a peak value of a harmonic component of an integral multiple of a fundamental operation frequency is plotted. The line NSi indicates a noise amount of i-fold harmonic of the fundamental operation frequency.

As known from FIG. 3, a minimum point exists in the odd-fold harmonic of the fundamental operation frequency. If the current amount flowing through the power supply line is adjusted to bring the current waveform area ratio (Sf/Sr) corresponding to the minimum point, the noise amount of the odd-fold harmonic of the fundamental operation frequency may be reduced.

Thus, in the present embodiment, the current observing section 40 observes the current amounts flowing through the power supply lines 4, 5. Based on the observation result in the current observing section 40, the current judging section 50 judges whether or not the current amounts bring the current waveform area ratio (Sf/Sr) corresponding to the minimum point of the odd-fold harmonic. Then, in accordance with the control signal in correspondence with the judgment result in the current judging section 50, the current amount adjusting section 30 adjusts the current amounts flowing at the rise and fall of the clock signal CLK to bring the current waveform area ratio (Sf/Sr) corresponding to the minimum point. Thereby, noise of the odd-fold harmonic of the fundamental operation frequency may be restrained.

Figure 4:
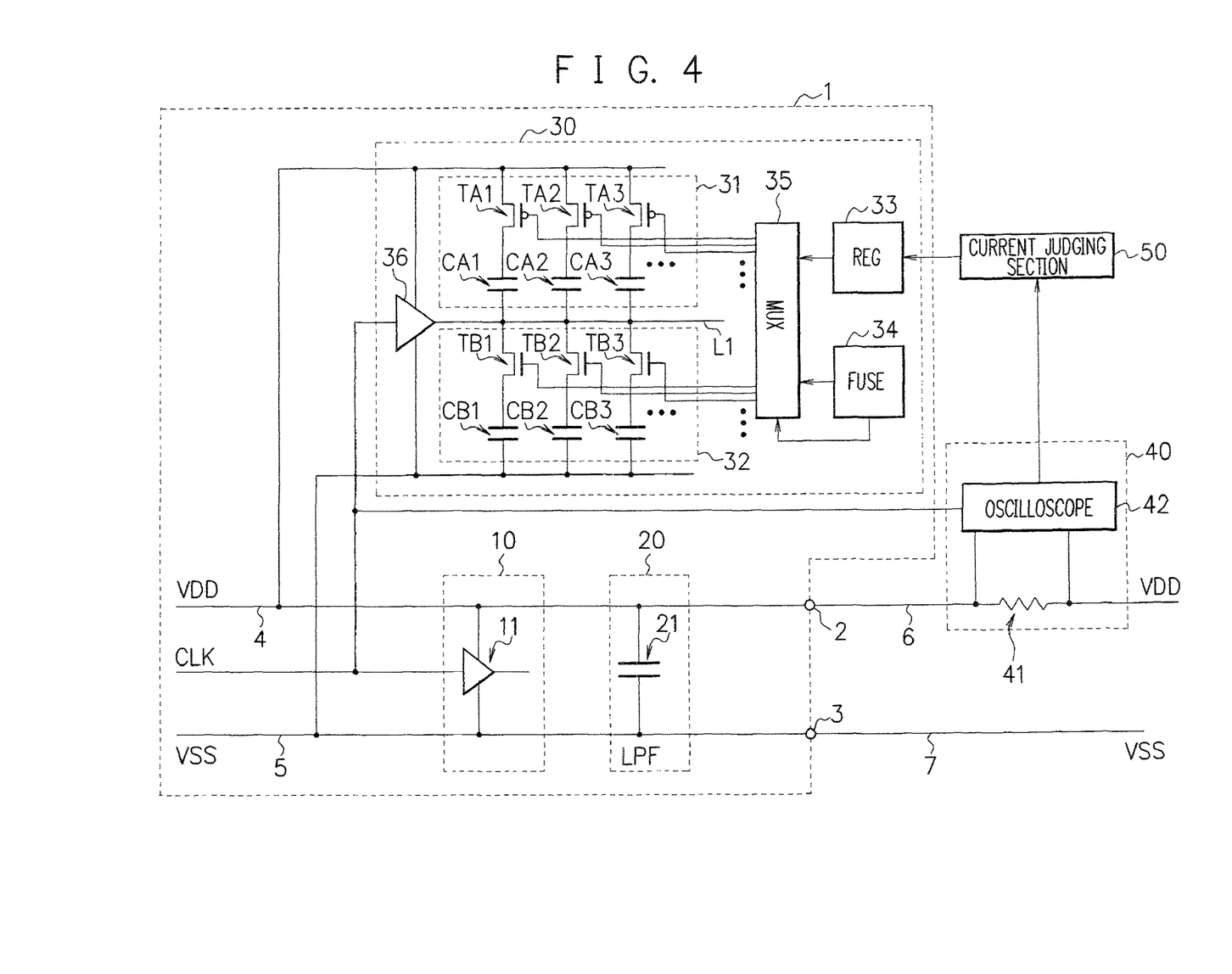
FIG. 4 is a diagram depicting a concrete constitution example of a semiconductor device in the present embodiment.

FIG. 4 is a diagram depicting a concrete constitution example of a semiconductor device according to the present embodiment. In FIG. 4, the same reference numerals and symbols are given to blocks or the like having the same functions as the blocks or the like depicted in FIG. 1, and an overlapping explanation will be omitted.

A semiconductor 1 has an internal circuit 10, an LPF 20, and a current amount adjusting section 30. A VDD power supply line 4 inside the semiconductor device 1 is electrically coupled to a VDD power supply line 6 of the outside the semiconductor device 1 via a VDD terminal 2. Similarly, a VSS power supply line 5 inside the semiconductor 1 is electrically coupled to a VSS power supply line 7 of the outside the semiconductor device 1 via a VSS terminal 3.

A current observing section 40 has a resistance 41 serially coupled to the VDD power supply line 6 of the outside the semiconductor device 1 and an oscilloscope 42 measuring voltage between both sides of the resistance 41. The oscilloscope 42 is supplied with a clock signal CLK of the semiconductor device 1 and is operated in synchronization with the clock signal CLK. A current judging section 50 judges whether or not a current waveform area ratio (Sf/Sr) is proper based on a waveform obtained by the oscilloscope 42.

It is noted that though the clock signal CLK is supplied to the oscilloscope 42 from the inside of the semiconductor device 1 in FIG. 4, a clock signal supplied from the outside to the semiconductor device 1, the clock signal being equivalent to the clock signal CLK, may be supplied. However, generally, distribution or the like of the clock signal is carried out inside the semiconductor device 1, and it is desirable that the clock signal CLK is supplied from the inside of the semiconductor 1 in order to prevent phase deviation or the like.

The current adjusting section 30 has a first variable capacitance circuit (first load circuit) 31, a second variable capacitance circuit (second load circuit) 32, a register 33, a fuse circuit (storage circuit) 34, a multiplexer (selection circuit) 35, and a buffer 36.

The clock signal CLK is inputted to the buffer 36. The buffer 36 is supplied with a power supply potential VDD by the VDD power supply line 4 and supplied with a reference potential VSS by the VSS power supply line 5.

The first variable capacitance circuit 31 is a capacitance circuit capable of controlling a capacitance value and is coupled between the VDD power supply line 4 and an output signal line (a clock signal line through which the clock signal is propagated) L1 of the buffer 36. The first variable capacitance circuit 31 acts when the clock signal CLK transits from a high level to a low level, that is, at the fall time. When the capacitance value of the first variable capacitance circuit 31 is increased, a current amount (current waveform area Sf) flowing at the fall of the clock signal CLK is increased.

The first variable capacitance circuit 31 is constituted, for example, with a plurality of capacitance elements CAp ("p" is a subscript, being a natural number) and switch transistors TAp. A first electrode of the capacitance element CAp is coupled to the output signal line L1, while a second electrode thereof is coupled to the VDD power supply line 4 via the switch transistor TAp. A gate of the switch transistor TAp is supplied with an output of the multiplexer 35 and the switch transistor TAp is independently ON/OFF-controlled in correspondence with the output. Therefore, for example, by making a capacitance value of the plural capacitance elements CAp be $2^{(p-1)}C$, the capacitance value of the first variable capacitance circuit 31 may be controlled to be an arbitrary integral multiple of a capacitance value C.

The second variable capacitance circuit 32 is a capacitance circuit capable of controlling a capacitance value and is coupled between the output signal line (clock signal line) L1 of the buffer 36 and the VSS power supply line 5. The second variable capacitance circuit 32 acts when the clock signal CLK transits from the low level to the high level, that is, at the rise time. When the capacitance value of the second variable capacitance circuit 32 is increased, a current amount (current waveform area Sf) flowing at the rise of the clock signal CLK is increased.

The second variable capacitance circuit 32 is constituted, for example, with a plurality of capacitance elements CBq ("q" is a subscript, being a natural number) and switch transistors TBq. A first electrode of the capacitance element CBq is coupled to the VSS power supply line 5, while a second electrode thereof is coupled to the output signal line L1 via the switch transistor TBq. A gate of the switch transistor TBq is supplied with the output of the multiplexer 35 and the switch transistor TBq is independently ON/OFF-controlled in correspondence with the output. Therefore, for example, by making a capacitance value of the plural capacitance elements CBq be $2^{(q-1)}C$, the capacitance value of the second variable capacitance circuit 32 may be controlled to be an arbitrary integral multiple of the capacitance value C.

It is noted that constitutions of the first variable capacitance circuit 31 and the second variable capacitance circuit 32 are not limited to the above, and the first variable capacitance circuit 31 and the second variable capacitance circuit 32 may be constituted by using varactor elements. Further, when a capacitance value bringing the current waveform area ratio (Sf/Sr) close to the minimum point may be determined at a designing stage, a capacitance with a fixed capacitance value may be provided instead of the variable capacitance circuit.

The register 33 is supplied with a control signal from the current judging section 50, and control codes (set values) to control the capacitance values (loads) of the first variable capacitance circuit 31 and the second variable capacitance circuit 32 are written into the register 33. The switch transistors TAp, TBq are ON/OFF-controlled in correspondence with the control codes written into the register 33, so that the capacitance values of the first variable capacitance circuit 31 and the second variable capacitance circuit 32 are controlled.

It is noted that when the control codes (set values) to control the capacitance values of the first variable capacitance circuit 31 and the second variable capacitance circuit 32 are determined as will be described later, the determined control codes may be stored in the fuse circuit 34 to ON/OFF-control the switch transistors TAp, TBq in correspondence with the control codes from the fuse circuit 34 by the multiplexer 35.

Further, in the semiconductor device depicted in FIG. 4, the register 33, the fuse circuit 34, and the multiplexer 35 are provided inside the current adjusting section 30 so that the multiplexer 35 selectively performs the output in correspondence with the control code from the register 33 or the fuse circuit 34, but the embodiment is not limited to the above. It is possible, for example, that neither a fuse circuit 34 nor a multiplexer 35 is provided but only a register 33 is provided so that the register 33 ON/OFF-controls switch transistors TAp, TBq in correspondence with a written control code.

Figure 5:
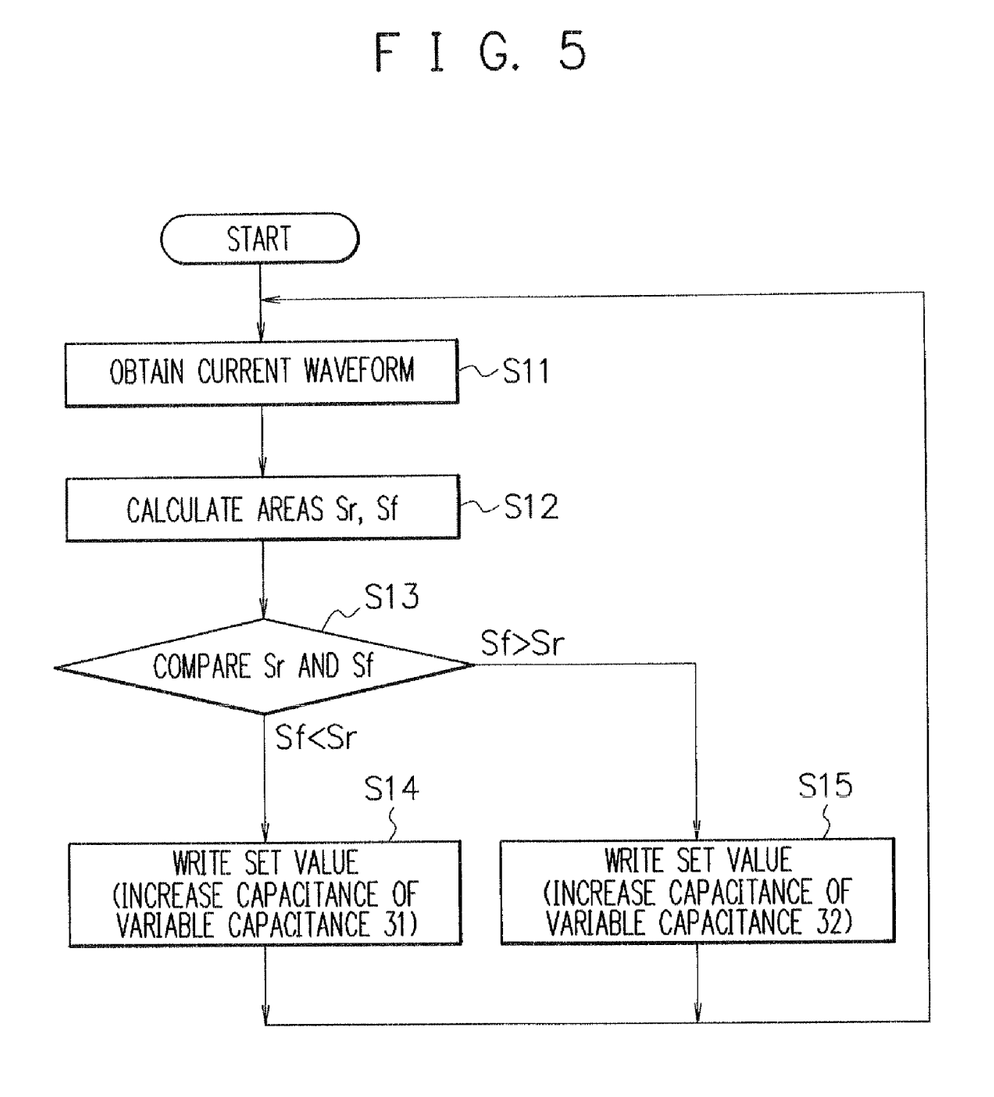
FIG. 5 is a flowchart depicting a current amount adjustment processing of the semiconductor device depicted in FIG. 4.

A current amount adjustment processing of the semiconductor device depicted in FIG. 4 will be described with reference to FIG. 5.

First, the current observing section 40 measures voltage between both sides of the resistance 41 serially coupled to the VDD power supply line 6 by the oscilloscope 42, whereby a current waveform may be obtained (S11).

Next, the current judging section 50 finds values equivalent to the current waveform area Sr at the rise of the clock signal and the current waveform area Sf at the fall of the clock signal, based on the current waveform obtained in the current observing section 40 (S12). Then, the current judging section 50 compares the found current waveform areas Sr and Sf (S13).

As a result of a comparison, when the current waveform area Sf is smaller than the current waveform area Sr, the current judging section 50 writes a set value (control code) into the register 33 so that the current waveform area Sf is increased, that is, so that the capacitance value of the first variable capacitance circuit 31 is increased (S14). On the other hand, when the current waveform area Sf is larger than the current waveform area Sr, the current judging section 50 writes a set value (control code) into the register 33 so that the current waveform area Sr is increased, that is, so that the capacitance value of the second variable capacitance circuit 32 is increased (S15).

The above-described processings of steps S11 to S15 are repeated to control the current waveform area ratio (Sf/Sr) to become "1". Thereby, the current waveform area ratio (Sf/Sr) becomes the current waveform area ratio (Sf/Sr) corresponding to the minimum point of the odd-fold harmonic of the fundamental operation frequency depicted in FIG. 3, and occurrence of noise of the odd-fold harmonic may be restrained.

It is noted that an eventual current waveform area ratio (Sf/Sr) may be other than "1", and may be close to the minimum point (for example, it is desirable that the current waveform area ratio (Sf/Sr) is about in a rage of 1±0.03).

Further, in the above description, when the current waveform area Sf is smaller than the current waveform area Sr, it is controlled that the capacitance value of the first variable capacitance circuit 31 is increased, but, if the capacitance value of the second variable capacitance circuit 32 is in a state of being able to be decreased, it may be controlled that the capacitance value of the second variable capacitance circuit 32 is decreased to decrease the current waveform area Sr. Similarly, in a case that the current waveform area Sf is larger than the current waveform area Sr, if the capacitance value of the first variable capacitance circuit 31 is in a state of being able to be decreased, it may be controlled that the capacitance value of the first variable capacitance circuit 31 is decreased to decrease the current waveform area Sf.

Figure 6:
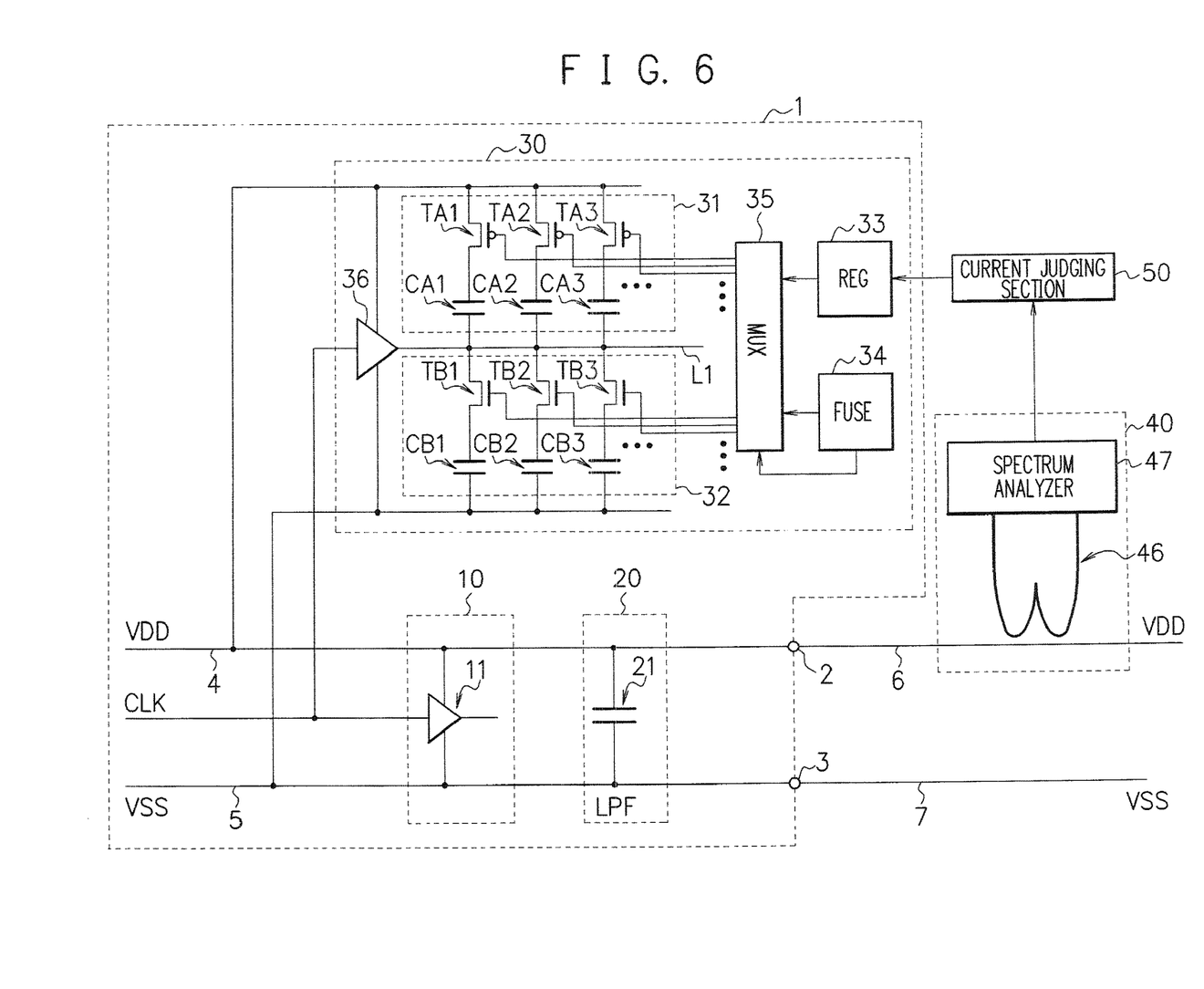
FIG. 6 is a diagram depicting another concrete constitution example of a semiconductor device in the present embodiment.

FIG. 6 is a diagram depicting another concrete constitution example of a semiconductor device in the present embodiment. In FIG. 6, the same reference numerals and symbols are given to blocks or the like having the same functions as the blocks or the like depicted in FIG. 1 and FIG. 4, and an overlapping explanation will be omitted.

A constitution depicted in FIG. 6 and the constitution depicted in FIG. 4 are different in the constitution of the current observing section 40. In FIG. 6, a current observing section 40 has a magnetic field probe 46 and a spectrum analyzer 47 which detect a magnetic field generated by a current flowing through a VDD power supply line 6. Here, since phase information may not be obtained by a common spectrum analyzer 47, a current amount at a rise of a clock signal and a current amount at a fall of a clock signal may not be discriminated. Thus, in the constitution depicted in FIG. 6, current amount adjustment of the semiconductor device is performed in accordance with a control flow depicted in FIG. 7.

Figure 7:
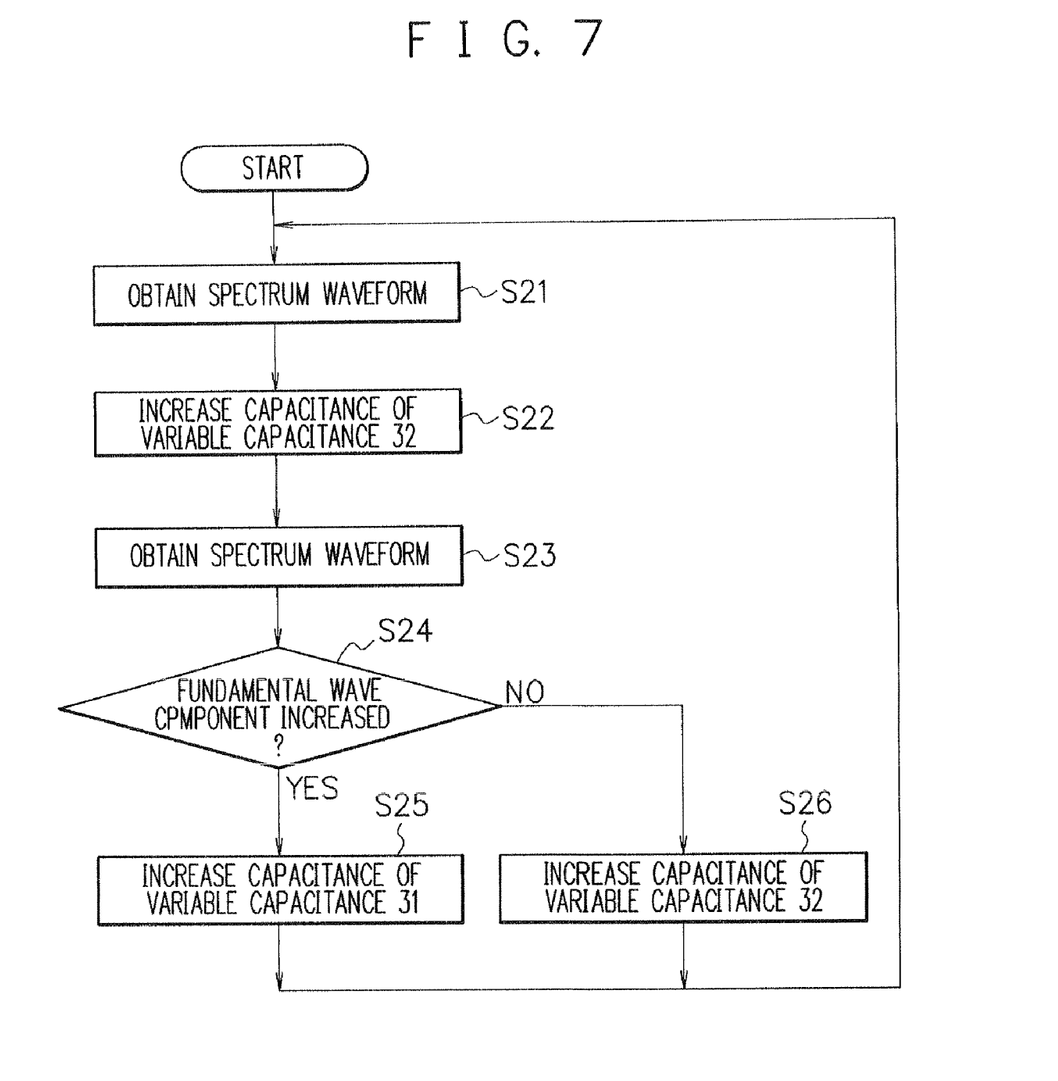
FIG. 7 is a flowchart depicting a current amount adjustment processing of the semiconductor device depicted in FIG. 6.

FIG. 7 is a flowchart depicting a current amount adjustment processing of the semiconductor device depicted in FIG. 6.

First, the current observing section 40 detects a change of a magnetic field of the VDD power supply line 6 by the spectrum analyzer 47 and obtains a spectrum waveform based on a flowing current (S21). Next, a current judging section 50 writes a set value (control code) into a register 33 so that a capacitance value of a second variable capacitance circuit 32 is increased (S22). Thereby, a current waveform area Sr is increased.

Subsequently, the current observing section 40 obtains a spectrum waveform based on a current flowing through the VDD power supply line 6 again (S23). Then, the current judging section 50 analyzes the spectrum waveforms obtained by the current observing section 40 in steps S21, S23 and compares fundamental wave components to judge whether or not the fundamental wave component is increased (S24). It is noted that though the fundamental wave components are compared in FIG. 7, odd-fold harmonics may be compared.

As a result of judgment, when the fundamental wave component is increased, the current judging section 50 writes a set value (control code) into the register 33 so that a capacitance value of a first variable capacitance circuit 31 is increased (S25). On the other hand, if the fundamental wave component is decreased, the current judging section 50 writes a set value (control code) into the register 33 so that the capacitance value of the second variable capacitance circuit 32 is increased (S26).

The above-described processings of steps S21 to S26 are repeated to control the current waveform area ratio (Sf/Sr) to change toward the minimum point of the odd-fold harmonic of the fundamental operation frequency depicted in FIG. 3, whereby occurrence of noise of the odd-fold harmonic may be restrained.

It is noted that in a case that the fundamental wave component is increased, if the capacitance value of the second variable capacitance circuit 32 is in a state of being able to be decreased, it may be controlled that the capacitance value of the second variable capacitance circuit 32 is decreased. Similarly, in a case that the fundamental waveform component is decreased, if the capacitance value of the first variable capacitance circuit 31 is in a state of being able to be decreased, it may be controlled that the capacitance value of the first variable capacitance circuit 31 is decreased.

Further, in the above-described embodiments, the current amount adjusting section 30 includes two variable capacitance circuits of the first variable capacitance circuit 31 coupled between the VDD power supply line 4 and the output signal line L1 and the second variable capacitance circuit 32 coupled between the output signal line L1 and the VSS power supply line 5, but the embodiment is not limited thereto.

For example, it may be designed so that a current amount (current waveform area Sf) flowing at a fall of a clock signal CLK is smaller than a current amount (current waveform area Sr) flowing at a rise of a clock signal and a first variable capacitance circuit 31 is provided. Further, it may be designed, for example, in contrast, so that a current amount (current waveform area Sf) flowing at a fall of a clock signal CLK is larger than a current amount (current waveform area Sr) flowing of a clock signal at a rise and a second variable capacitance circuit 32 is provided.

It is noted that when a semiconductor device has a plurality of clock domains, the embodiment may be applied to each clock domain. In other words, it may be possible to provide a current amount adjusting section 30 in one clock domain to perform adjustment of a current amount and adjustment of a current amount is not performed in another clock domain.

Further, in the constitutions depicted in FIG. 4 and FIG. 6, the current observing section 40 and the current judging section 50 are provided outside the semiconductor device 1, but the current observing section 40 and the current judging section 50 may be provided inside the semiconductor device 1, or one of the current observing section 40 and the current judging section 50 may be provided inside the semiconductor device 1.

Further, the above-described embodiments are to be considered in all respects as illustrative and no restrictive, and all changes which come within the meaning and range of equivalency of the claims are therefore intended to be embraced therein. The embodiments may be embodied in other specific forms without departing from the spirit or essential characteristics thereof.

According to the embodiment, by adjusting a current amount at a rise of a clock signal and a current amount at a fall of a clock signal so as to bring a current waveform area ratio corresponding to a minimum point of an odd-fold harmonic of a fundamental operation frequency, noise of the odd-fold harmonic of the fundamental operation frequency may be restrained.

According to the embodiment, it is possible to adjust a ratio of a consumed charge amount by the current flowing through the power supply line at the rising edge of the clock signal and a consumed charge amount by the current flowing through the power supply line at the falling edge of the clock signal, so that noise generated in the power supply line may be restrained.

Although the embodiments are numbered with, for example, "first," "second," or "third," the ordinal numbers do not imply priorities of the embodiments. Many other variations and modifications will be apparent to those skilled in the art.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments have been described in detail, it should be understood that the various changes, substitutions, and alterations could be made hereto without departing from the spirit and scope of the invention.

What is claimed is:

1. A semiconductor device comprising:
   an internal circuit including a circuit operating based on a clock signal;
   a power supply line supplying power to the internal circuit; and
   a current amount adjusting section adjusting an amount of a first current flowing through the power supply line at a rising edge of the clock signal and an amount of a second current flowing through the power supply line at a falling edge of the clock signal in synchronization with the clock signal.

2. The semiconductor device according to claim 1, wherein the current amount adjusting section adjusts the amount of the first current and the amount of the second current so that a consumed charge amount by the first current and a consumed charge amount by the second current become equal.

3. The semiconductor device according to claim 1, wherein the current amount adjusting section comprises at least one of a first load circuit coupled between the first power supply line supplying a power supply potential among power supply lines and a signal line through which the clock signal is propagated, and a second load circuit coupled between the second power supply line supplying a reference potential among power supply lines and the signal line through with the clock signal is propagated.

4. The semiconductor device according to claim 3, wherein loads are variable in the first and second load circuits.

5. The semiconductor device according to claim 3, wherein the first and second load circuits are variable capacitance circuits capable of changing capacitance values.

6. The semiconductor device according to claim 5, wherein in the variable capacitance circuit, a plurality of pairs of a capacitance element and a switching element corresponding to each capacitance element is parallelly coupled between the power supply line and the signal line through which the clock signal is propagated.

7. The semiconductor device according to claim 3, wherein the current amount adjusting section comprises a control register controlling the first and second load circuits, and magnitudes of the loads by the first and second load circuits are controlled in correspondence with a set value set by the control register.

8. The semiconductor device according to claim 3, wherein the current amount adjusting section comprises:
a storage circuit storing a fixed value; and
a selection circuit controlling the magnitudes of the loads by the first and second load circuits in correspondence with the fixed value outputted from the storage circuit.

9. The semiconductor device according to claim 8, wherein the storage circuit is a fuse circuit.

10. The semiconductor device according to claim 1, comprising:
a current judging section comparing the amount of the first current and the amount of the second current based on an observation result of the current amount flowing through the power supply line to supply a control signal in correspondence with a comparison result to the current amount adjusting section.

11. The semiconductor device according to claim 10, wherein
the current judging section judges which is larger of a consumed charge amount by the first current and a consumed charge amount by the second current.

12. The semiconductor device according to claim 10, wherein
the current judging section judges whether or not a frequency component of (2n−1) folds (n is an arbitrary natural number) of a frequency of the clock signal is increased after adjustment of the current amount by the current amount adjusting section.

13. The semiconductor device according to claim 10, comprising:
a current observing section observing the current amount flowing through the power supply line and outputting an observation result to the current judging section.

14. The semiconductor device according to claim 13, wherein
the current observing section is a voltage measuring section measuring voltage between both ends of a current detection resistance serially coupled to the power supply line in synchronization with the clock signal.

15. The semiconductor device according to claim 13, wherein
the current observing section is a spectrum detecting section observing the current amount flowing through the power supply line based on a magnetic field by the current.

16. The semiconductor device according to claim 1, wherein
the semiconductor device has a plurality of clock domains and comprises the current amount adjusting section in at least one clock domain.

17. The semiconductor device according to claim 16, wherein
the amount of the first current and the amount of the second current are adjustable per the plurality of clock domains.

* * * * *